Sept. 12, 1933.                R. CHILTON                1,926,329
                                 PISTON
                           Filed Sept. 18, 1930
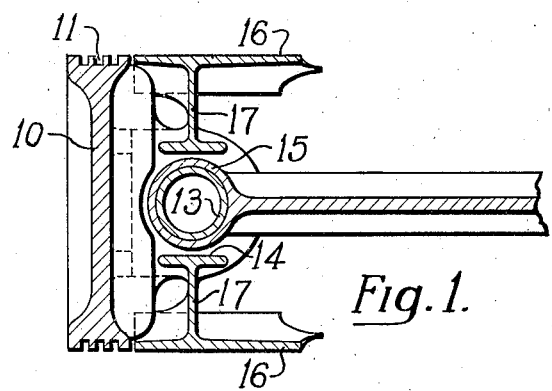
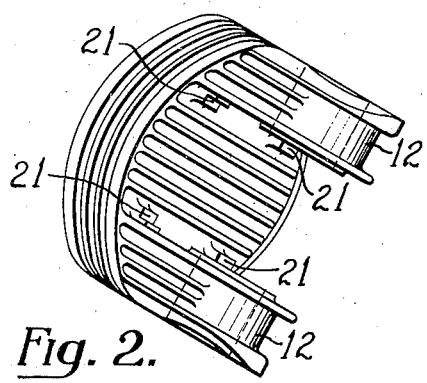
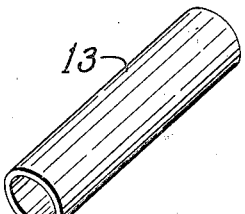
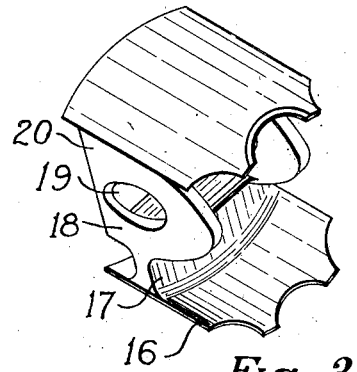
INVENTOR.
ROLAND CHILTON
BY
ATTORNEYS.

Patented Sept. 12, 1933

1,926,329

UNITED STATES PATENT OFFICE 1,926,329

PISTON

Roland Chilton, Ridgewood, N. J., assignor to Wright Aeronautical Corporation, a corporation of New York Application September 18, 1930
Serial No. 482,674

3 Claims. (Cl. 309—15)

My invention relates to pistons such as are used in internal combustion engines wherein the piston is subject to side thrust from the connecting rod.

One object of the invention is to improve the durability of the piston wearing surface and to overcome the troubles encountered due to tilting of the piston, which in conventional construction is apt to cause high localized bearing pressures at the ends of the bearing surface which creates a scraping action, which often breaks down the lubricating film and destroys the bearing surface.

A further object is to provide a simple two-piece piston wherein the skirt or slipper portion may be made of different material from the head and whereby these parts may be held in assembled relation in a secure and simple manner, and one whereby heat conduction from the head to the bearing surface may be minimized.

In thrust and journal bearings it has been found that for effective lubrication it is essential that there be a variation in thickness in the oil film, which should be greatest where the oil enters the pressure zone so that a wedging action is generated by the relative movement of the parts, which automatically entrains the oil and builds up the film to support the surfaces from metallic contact.

The required variations in film thickness are very small and apt to be destroyed by distortion or unavoidable inaccuracies in the parts. This has been overcome in journal and thrust bearings by using segments flexibly supported so as to automatically insure a low pressure at the forward edge. The present invention provides a new structure by which this desirable effect may be realized in a piston in spite of the tilting and warpage to which these members are subject.

It has been found in actual practice that piston failure in large aircraft engines, for example, is often the result of high intensity of pressure at the ends of the bearing surfaces caused by the tipping of pistons having relatively rigid skirts, such as result when the head and the skirt are made integral. It will be seen that the relatively flexible construction of the present invention insures that the maximum intensity of bearing pressure will be towards the center instead of at the ends of the surfaces, so that a low pressure zone of entry is provided for the lubricant whereby complete film lubrication is automatically maintained in spite of slight inaccuracies and tilting tendency as encountered in practice.

Referring now to the drawing in which similar parts are designated by similar numbers:

Fig. 1 is an axial section through a piston taken normal to the axis of the wrist pin;

Fig. 2 is a perspective drawing of the head part of the piston;

Fig. 3 is a perspective drawing of the skirt or slipper member;

Fig. 4 is a perspective drawing of the wrist pin which also serves to secure these parts in assembled relation.

In the drawing 10 represents the head part of the piston which is provided with the usual piston ring grooves 11 and integral lugs 12 which are bored to receive the wrist pin 13.

The skirt or slipper portion of the piston consists of a frame 14 surrounding the connecting rod head 15 and united to the shoes or slipper members 16 by horizontal webs 17. The sides or bosses 18 of the frame 14 are bored at 19 to fit the wrist pin and fit between the lugs 12 of the head. These bosses are also flatted off at 20 to abut the stop surfaces 21 to prevent relative rocking between the head and slipper portions when held in assembled relation by the insertion of the wrist pin.

The slippers 16 have appreciable flexibility while the side thrust load from the wrist pin is transmitted to them only by a compressive load in the webs 17 from which the slippers project. Thus, under side thrust loading, the intensity of bearing pressure between the slipper and the cylinder wall will be relatively great in the region of the web 17 and relatively slight at the free ends of the slippers which, due to their flexibility, will tend to ride up on the oil film according to the well-known theory of film lubrication.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination for use in a cylinder, of a piston having wrist pin bearings; a cylinder engaging member comprising independently flexible slippers, a bearing boss intermediate said slippers, and single substantially flat ribs disposed with their flat sides normal to the piston axis, each said rib extending between said bearing boss and one said slipper, for allowing the ends of said slippers to flex toward and away from said piston axis; and a wrist pin adapted to engage said wrist pin bearings and said bearing boss.

2. The combination for use in a cylinder, of a piston having a head and a wrist pin bearing, a pair of cylinder engaging slippers, bearing bosses intermediate the ends of said slippers, substantially flat ribs disposed normal to the piston axis and joining said bearing bosses with said slippers, said slippers being free to flex, on either side of said rib, relative to said head and to each other, in a direction toward and away from said piston axis, and a wrist pin engaging said wrist pin bearings and said bearing bosses, said pin forming the only connection between said head and said bearing bosses.

3. A piston including a head having wrist pin bearings; means for guiding said piston within a cylinder comprising a pair of relatively thin flexible slippers, bosses, a pair of substantially flat ribs disposed normal to the piston axis and each uniting one said slipper with one said boss, whereby the slipper ends close to and remote from said head may flex independently toward and away from the piston axis; and a wrist pin engaging said wrist pin bearings and said bosses for holding said head and said guiding means in substantially fixed relation.

ROLAND CHILTON.